United States Patent
Venkatraman et al.

(10) Patent No.: US 9,363,761 B2
(45) Date of Patent: Jun. 7, 2016

(54) SYSTEM AND METHOD FOR PERFORMANCE ENHANCEMENT IN HETEROGENEOUS WIRELESS ACCESS NETWORK EMPLOYING BAND SELECTIVE POWER MANAGEMENT

(75) Inventors: Shankar Venkatraman, Irvine, CA (US); Khurram P. Sheikh, San Clemente, CA (US)

(73) Assignee: Intel Corporation, Santa Clara, CA (US)

(*) Notice: Subject to any disclaimer, the term of this patent is extended or adjusted under 35 U.S.C. 154(b) by 324 days.

(21) Appl. No.: 13/439,658

(22) Filed: Apr. 4, 2012

(65) Prior Publication Data

US 2012/0196611 A1   Aug. 2, 2012

Related U.S. Application Data

(63) Continuation-in-part of application No. 13/079,558, filed on Apr. 4, 2011.

(60) Provisional application No. 61/321,113, filed on Apr. 5, 2010.

(51) Int. Cl.
*H04W 52/04* (2009.01)
*H04W 52/14* (2009.01)
(Continued)

(52) U.S. Cl.
CPC .......... *H04W 52/143* (2013.01); *H04W 52/343* (2013.01); *H04W 52/346* (2013.01); *H04W 52/42* (2013.01); *Y02B 60/50* (2013.01)

(58) Field of Classification Search
CPC ..... H04W 52/30; H04W 52/34; H04W 52/36; H04W 52/343; H04W 52/346
See application file for complete search history.

(56) References Cited

U.S. PATENT DOCUMENTS

| 6,411,817 B1 | 6/2002 | Cheng et al. |
| 6,580,905 B1 | 6/2003 | Naidu et al. |
| 6,587,690 B1 | 7/2003 | Di Huo et al. |

(Continued)

FOREIGN PATENT DOCUMENTS

| CN | 101595650 A | 12/2009 |
| WO | 2009/061106 A2 | 5/2009 |

(Continued)

OTHER PUBLICATIONS

International Search Report and Written Opinion for International Application No. PCT/US2011/030807 dated Jun. 13, 2011, 9 pages.

(Continued)

*Primary Examiner* — Lewis West
*Assistant Examiner* — Dong-Chang Shiue
(74) *Attorney, Agent, or Firm* — Schwegman Lundberg & Woessner, P.A.

(57) ABSTRACT

A system and method for enhancing the performance in heterogeneous wireless access networks employing a distributed antenna system is disclosed. A control unit comprises a distributed antenna system management server which collects load information from each of the carriers. The control unit further comprises a power management decision engine which determines the optimal downlink transmission power level for the carriers based on the collected load information and a set of parameters related to the power for the carriers. Power levels may decrease to baseline parameters when the load on carriers decreases.

19 Claims, 7 Drawing Sheets

(51) Int. Cl.
*H04W 52/34* (2009.01)
*H04W 52/42* (2009.01)

(56) References Cited

U.S. PATENT DOCUMENTS

| | | | |
|---|---|---|---|
| 6,690,939 B1 | 2/2004 | Jonsson et al. | |
| RE41,936 E | 11/2010 | Woodhead et al. | |
| 8,311,027 B2* | 11/2012 | Padovani et al. | 370/347 |
| 8,582,536 B2 | 11/2013 | Laroia et al. | |
| 2002/0094833 A1 | 7/2002 | Lieshout et al. | |
| 2005/0136961 A1 | 6/2005 | Simonsson et al. | |
| 2007/0042798 A1* | 2/2007 | Chen et al. | 455/522 |
| 2007/0253385 A1* | 11/2007 | Li et al. | 370/338 |
| 2008/0186107 A1 | 8/2008 | Rhodes et al. | |
| 2008/0214196 A1 | 9/2008 | Sambhwani et al. | |
| 2008/0252522 A1 | 10/2008 | Asbridge | |
| 2009/0080349 A1* | 3/2009 | Rofougaran | 370/311 |
| 2009/0176448 A1 | 7/2009 | Solum | |
| 2009/0197632 A1* | 8/2009 | Ghosh et al. | 455/522 |
| 2009/0213805 A1* | 8/2009 | Zhang et al. | 370/329 |
| 2009/0285158 A1* | 11/2009 | Rezaiifar et al. | 370/328 |
| 2009/0318183 A1* | 12/2009 | Hugl et al. | 455/522 |
| 2010/0020704 A1* | 1/2010 | Hu et al. | 370/252 |
| 2010/0080137 A1 | 4/2010 | Vedantham et al. | |
| 2010/0144282 A1 | 6/2010 | Laroia et al. | |
| 2010/0202392 A1* | 8/2010 | Zhang et al. | 370/329 |
| 2010/0202431 A1* | 8/2010 | Kazmi et al. | 370/342 |
| 2011/0244853 A1 | 10/2011 | Sheikh et al. | |
| 2011/0244914 A1 | 10/2011 | Venkatraman et al. | |
| 2012/0100814 A1* | 4/2012 | Soulhi | H04B 7/0491 455/67.14 |

FOREIGN PATENT DOCUMENTS

| | | |
|---|---|---|
| WO | 2009/134180 A1 | 11/2009 |
| WO | 2009/134200 A1 | 11/2009 |

OTHER PUBLICATIONS

Office Action dated May 14, 2012 from U.S. Appl. No. 13/077,556.
International Preliminary Report on Patentability for International Application No. PCT/US2011/030804 dated Oct. 11, 2012, 8 pages.
International Search Report and Written Opinion pertaining to International Application No. PCT/US2012/032184 dated Jul. 10, 2012.
Supplementary European Search Report for related European application 12767271.5, dated Aug. 7, 2014, 6 pp.
"U.S. Appl. No. 13/079,558, Non Final Office Action mailed Apr. 24, 2014", 14 pgs.
"U.S. Appl. No. 13/079,558, Notice of Allowance mailed Dec. 9, 2014", 8 pgs.
"U.S. Appl. No. 13/079,558, Response filed Oct. 22, 2014 to Non Final Office Action mailed Apr. 24, 2014", 11 pgs.
"Chinese Application U.S. Appl. No. 201280027262.6, Office Action mailed Dec. 25, 2014", 26 pgs.
"European Application Serial No. 12767271.5, Office Action mailed Nov. 15, 2013", 3 pgs.
"European Application Serial No. 12767271.5, Response filed Feb. 4, 2014 to Office Action mailed Nov. 15, 2013", 13 pgs.
"International Application Serial No. PCT/US2012/032184, International Preliminary Report on Patentability mailed Oct. 17, 2013", 11 pgs.
"Chinese Application Serial No. 201280027262.6, Office Action mailed Sep. 14, 2015", 7 pgs.

* cited by examiner

SYSTEM AND METHOD FOR PERFORMANCE ENHANCEMENT IN HETEROGENEOUS WIRELESS ACCESS NETWORK EMPLOYING BAND SELECTIVE POWER MANAGEMENT

RELATED APPLICATION INFORMATION

The present application is a continuation-in-part of U.S. patent application Ser. No. 13/079,558 filed Apr. 4, 2011, which claims priority under 35 U.S.C. Section 119(e) to U.S. Provisional Patent Application No. 61/321,113 filed Apr. 5, 2010, the disclosures of which are incorporated herein by reference in their entirety.

BACKGROUND OF THE INVENTION

1. Field of the Invention

The present invention relates generally to methods and systems related to wireless telephony. More particularly, the invention relates to wireless systems employing distributed antenna systems and related methods.

2. Description of the Prior Art and Related Background Information

Modern wireless telephone systems often employ distributed antenna systems ("DAS") for communicating with users within a cell region. The transmission power for the DAS must be optimized to enhance the network capacity. However, conventional wireless systems do not optimize cell capacity based on the real-time requirements of the users within the cell region.

Accordingly, a need exists to optimize the performance of wireless telephone systems employing distributed antenna systems.

SUMMARY OF THE INVENTION

In a first aspect the present invention provides a method for optimizing downlink transmission power of a distributed antenna system. The method comprises collecting individual carrier load information from a multi-carrier base station operating on a plurality of carriers, and varying a downlink transmission power for at least one carrier of the plurality of carriers to a different value from at least one other carrier based on the collected carrier load information.

In a preferred embodiment, varying the downlink transmission power further comprises determining whether a carrier of the plurality of carriers has a carrier load greater than a pre-defined threshold, and increasing the downlink transmission power for the carrier having the carrier load greater than the predefined threshold. The method preferably further comprises determining downlink transmission power operating parameters for the plurality of carriers, and determining an available surplus increase of downlink transmission power for the carrier having the carrier load greater than the pre-defined threshold. Increasing the downlink transmission power for the carrier having the carrier load greater than the predefined threshold preferably further comprises increasing the downlink transmission power by an amount less than or equal to the determined available increase of downlink transmission power. Increasing the downlink transmission power may further comprise determining a total available power level for the plurality of carriers, determining a proportionality factor based on the downlink transmission power operating parameters and the collected carrier load information, and determining the product of the total available power level and the proportionality factor. Determining the total available power level is preferably based on the downlink transmission power operating parameters and the collected carrier load information. The method preferably further comprises resetting the downlink transmission power to baseline values when the collected carrier load is less than a carrier load threshold. The method preferably further comprises determining a time when a carrier having a carrier load exceeds a second pre-defined threshold, and comparing the time when the carrier having a carrier load exceeds a second pre-defined load threshold to a temporal hysteresis threshold. The method may further comprise generating a ranked list of carriers based on the collected carrier load information from a plurality of carriers, and varying a downlink transmission power further comprises varying a downlink transmission power for carriers ranked highest in the ranked list of carriers.

In another aspect the present invention provides a wireless system comprising a multi-carrier base station receiving multi-carrier communication signals having a plurality of carriers, the multi-carrier base station comprising one or more multi-carrier amplifier systems amplifying the multi-carrier communication signals. The wireless system further comprises one or more antennas coupled to the base station and providing a downlink signal, and a power management control unit for varying a downlink transmission power for at least one carrier of the plurality of carriers to a different value from at least one other carrier.

In a preferred embodiment, the power management control unit comprises a load collection means for collecting load information of the plurality of carriers and providing values of downlink transmission power levels to the multi-carrier amplifier systems. The load collection means may be coupled to a network and collects load information from the network. The load collection means alternatively may be coupled to the multi-carrier base station and collects load information from the multi-carrier base station. The control unit preferably further comprises a power management decision engine configured for generating power level control signals to the carriers, wherein the power level control signals are based on the collected load information.

In another aspect the present invention provides a wireless distributed antenna system, comprising a multi-carrier base station receiving multi-carrier communication signals having a plurality of carriers, the multi-carrier base station comprising one or more multi-carrier amplifier systems amplifying the multi-carrier communication signals. The wireless distributed antenna system further comprises a distributed antenna system having a plurality of separate antenna systems, the distributed antenna system coupled to the multi-carrier base station and providing a downlink signal, and a control unit coupled to the multi-carrier base station and collecting load information of the plurality of carriers and providing different values of downlink transmission power to the multi-carrier amplifier systems.

In a preferred embodiment, the control unit is further configured for collecting the load information from the multi-carrier base station. Alternatively, the control unit is further configured for collecting the load information from a network. The control unit preferably further comprises a distributed antenna system management server collecting load information from the plurality of carriers, and a power management decision engine generating power level control signals to the carrier. The power management decision engine is preferably configured for determining the power level control signals based on the collected load information and downlink power operating parameters. The wireless system preferably further comprises a second multi-carrier base station receiving second multi-carrier communication signals having a plurality of second carriers, the second multi-carrier base station comprising one or more second amplifiers amplifying the second multi-carrier communication signals, and a second distributed antenna system having a plurality of second separate antenna systems, the second distributed antenna system coupled to the second multi-carrier base station and providing a second downlink signal. The control unit is preferably coupled to the second multi-carrier base station and collects load information from the plurality of second carriers and provides values of downlink transmission power to the plurality of second carriers.

Further features and aspects of the invention are set out in the following detailed description.

DETAILED DESCRIPTION OF THE INVENTION

Figure 1:
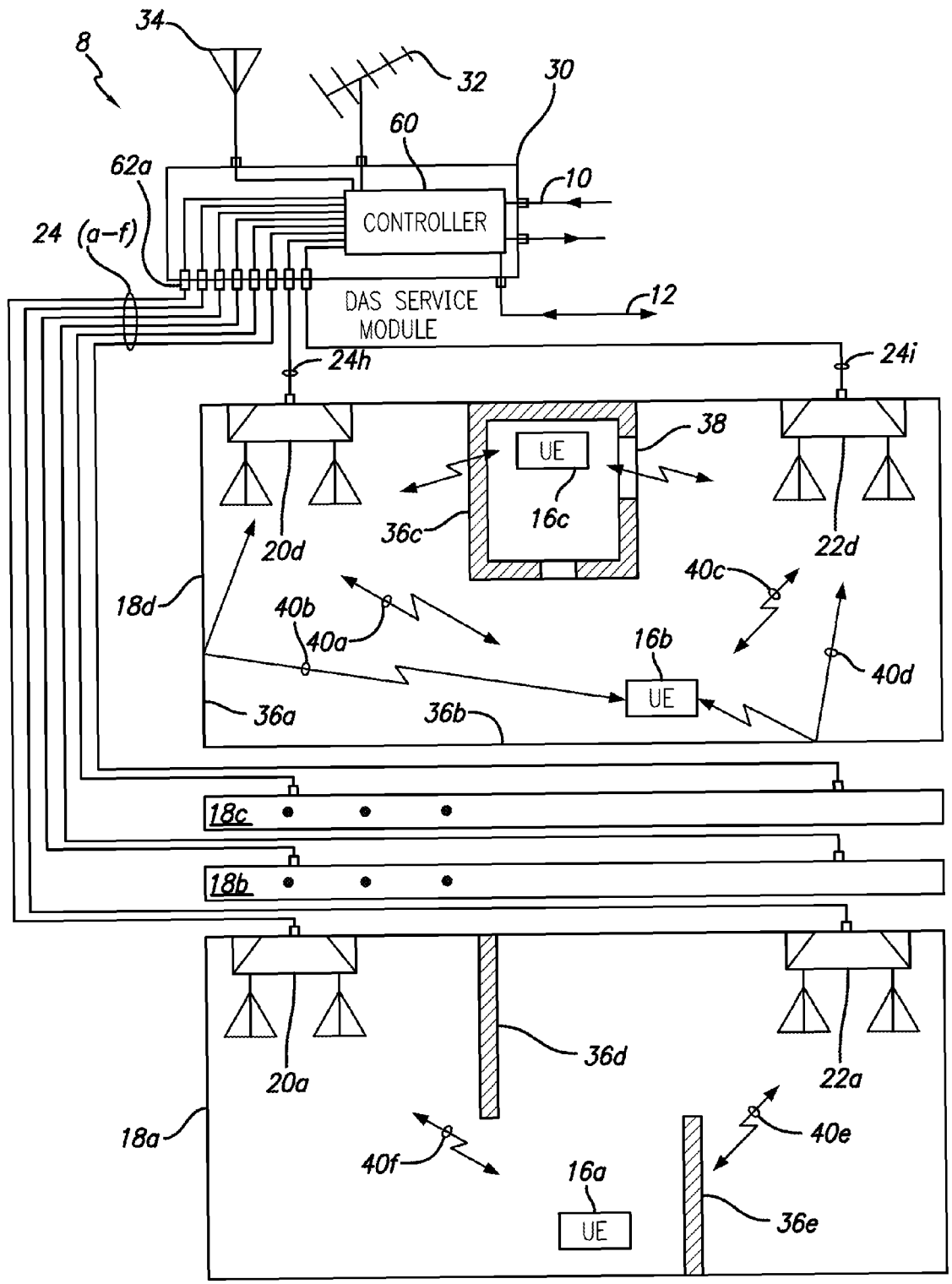
FIG. 1 is a representation of a distributed antenna system ("DAS") servicing multiple indoor rooms in accordance with the present invention.

It is an object of the present invention to provide a system and related methods for dynamically optimizing the performance of indoor distributed antenna systems for communicating to user equipment such as cellular telephones, smart phones, or other mobile devices. A major problem associated with indoor distributed antenna systems is multi-path fading. In an embodiment, the user equipment measures information describing the downlink signals transmitted by the antenna units such as the downlink data rates, the quality of the received signal, and the location of the user equipment. A service module collects this information and determines optimized power levels for each of the antenna units. The service module may optimize only one antenna unit or a subset of the antenna units within the distributed antenna system in a preferred embodiment. One or more of the antenna units then transmits downlink signals with the optimized power levels. The optimized power level may decrease in a preferred embodiment. As a result, the performance of the indoor distributed antenna systems is enhanced.

Modern mobile communications networks require enhanced efficiency and performance. These goals may be attained by increasing network capacity during peak usage hours, enhancing the data rates for mobile data devices while maintaining signal quality and network coverage, and reducing harmful interference to co-located wireless services. Modern smart phones transmit and receive both voice signals and data signals which place additional demands on the wireless system to respond to dynamically changing wireless traffic. Moreover, technological advances and evolution of communication standards place further demands on wireless service providers as the communication medium rapidly transitions from voice to on demand data.

Distributed antenna systems ("DAS") have been employed in indoor locations to provide better signal coverage, to improve network capacity, and to increase data rates in large office buildings, hospitals, stadiums, shopping malls, and outdoor venues such as college campuses. A typical DAS is a collection of small service antennas spread over a desired geographic area and connected by fiber or coax back to a donor node where base station signals are coupled onto the DAS network. The DAS technology enables carriers to reduce gaps in coverage areas and dead spots in the macro network by partitioning the macro cell site into smaller regions.

Traditional deployments of DAS networks involve static engineering of DAS antenna units or nodes and remote units in which the antenna units operate with fixed target power levels per carrier. This traditional approach provides a certain quality of coverage in a given area. Traditional deployments only consider the macro signal path loss and signal strengths as part of the engineering exercise, but are unable to fine tune the system parameters to specific deployment scenarios or for specific capacity.

In traditional DAS systems (both passive and active), the received signal level of −75 dBm was used as a general design guideline for DAS systems. However, if these received signal levels lead to significant multipath, under some operational conditions it is highly advantageous to reduce received signal levels from −75 dBm down to −85 dBm if the orthogonality can be improved. This requires a DAS system capable to control the gain/transmitter power (and other operational parameters) remotely, at individual access nodes with the objective of optimizing the received signal levels (or path loss) to increase orthogonality in a specific environment and operational requirements.

Third generation systems such as 3G systems or 3.5 G HSDPA ("High-Speed Downlink Packet Access") systems support downlink speeds of 1.8, 3.6, 7.2 and 14.0 Mbit/s ("Megabits per second"). Higher downlink speeds are available with HSPA+, which provides downlink speeds of up to 42 Mbit/s and 84 Mbit/s with Release 9 of the 3GPP standards. OFDM ("Orthogonal Frequency Division Multiplexing") provides inherent advantages over CDMA ("Code Division Multiple Access") for systems having 10 MHz of bandwidth or more. Bandwidths in the range of 10 to 20 MHz are attainable with advanced antenna architectures such as Multiple Input Multiple Output ("MIMO") or Adaptive Antenna Systems ("AAS"). Extremely high peak data rates are attainable because OFDM requires less complex computations than those based on the CDMA protocol. HSDPA employs the modulation used in WCDMA of Quadrature Phase Shift Keying ("QPSK") and an advanced modulation scheme such as 16 Quadrature Amplitude Modulation ("16 QAM"). Depending on the condition of the radio channel, different levels of forward error correction (i.e., channel coding) can also be employed. For example, a three quarter coding rate requires that three quarters of the bits transmitted are user bits and one quarter of the bits are error correcting bits. The process of selecting and quickly updating the optimum modulation and coding rate is referred to as link adaptation.

A further advantage of HSDPA adaption is its full compatibility with WCDMA, and thus it can be deployed as a software only upgrade in newer WCDMA networks. Initially, Release 5 HSDPA capable devices will be capable of transmitting with 3.6 Mbps peak rates. Release 6 of an enhanced uplink protocol ("EUL"), also referred to as HSUPA ("High-Speed Uplink Packet Access"), will provide improved throughput, reduced latency, and increased capacity. EUL, as well as the Enhanced Dedicated Channel ("E-DCH"), provide data rates of up to 5.8 Mbps. The combination of HSDPA and EUL is called HSPA. To further boost the peak data rate and capacity, the 3GPP Release 7 introduced the HSPA evolution (also called HSPA+), which supports MIMO, 64QAM in the downlink, and 16QAM in the uplink. Release 8 supports downlink bitrates of 42 Mbps through a combination of 64QAM and MIMO or through using dual carriers with 64QAM modulation.

These technologies which support high data rates require radio link adaptation that fully utilizes channel capacity for each communication link in the wireless environment to maximize the throughput of scheduling-based systems. Conventional high data rate wireless links were deployed primarily in outdoor scenarios. Indoor wireless systems present additional challenges due to increased path losses and rapidly changing multipath signals which introduces complications into signal processing techniques supported by E-DCH. E-DCH was developed primarily for use in urban, suburban, and rural settings.

To address these indoor (in-building) deployment challenges, embodiments of the present invention provide a remotely manageable active DAS which enables dynamic system optimization based on operational parameters. These operational parameters include, but are not limited to, the peak data rate, the sustainable maximum data rate, the number of UEs ("User Equipment") at a given QOS ("Quality of Service") levels. DAS systems exhibit performance flexibility by employing co-operative multi-code optimization in HSPA. Systems employing the HSPA 7.2 protocol preferably operate in an environment without multi-path interference to obtain the full benefit of the code orthogonality.

Embodiments of the present invention contrast with conventional DAS systems. The conventional approaches, such as Release 7 MIMO on HSPA, suggest that the transmission signal strength should be increased to compensate for multi-path effects. Embodiments of the present invention may be applied to other Radio Access Technologies ("RATs") such as, but not limited to Wi-Fi, WiMax, and other developing technologies. RATS can be implemented in a neutral host active DAS, especially in high traffic situations with radio access loading and balancing and multi-mode, multi-band UEs, is readily affordable while providing high level QOS not otherwise possible with a single radio access implementation. Moreover, some deployments such as for a stadium, the DAS system needs to minimize gain in selected areas especially when having a cell split (i.e. sectorized DAS). The ability to selectively control the gain in overlapping regions will reduce inter-sector interference.

Embodiments of the present invention include a flexible remote management system that can optimize EIRP per antenna in the path by varying the total DAS gain and link gain in the path per antenna. Moreover, embodiments may vary individual repeater gain (as in case of low power zinwave nodes) with the objective of altering the effective channel in order to maximize system performance. Therefore, it is desirable to employ active DAS system and method that avoids above mentioned limitations while providing means for enhanced wireless service.

Simulations suggest that the active DAS system exhibits enhanced performance compared to conventional systems. The SINR ("Signal to Interference-plus-Noise Ratio") for the received signal on a HS-DSCH ("High Speed Downlink Shared Channel") is given by the following equation $$SINR_{HS-DSCH} = \frac{SF_{16} \cdot P_{HS-DSCH}}{(1-\alpha) \cdot P_{own} + P_{other} + N_o} \quad \text{(Eqn. 1)}$$

where $\alpha$ is the orthogonality factor, $P_{own}$ is the total received power from the serving base station or antenna, $P_{HS-DSCH=}$ is the total received power on the HS-DSCH channel, $P_{other}$ is the total received power from another base station, and $SF_{16}$ is the spreading factor of 16.

Equation 1 and the orthogonality factor $\alpha$ are well established parameters in analyzing performance of a HSPA network. A multipath environment can affect the orthogonality of the spreading codes, resulting in intra-cell interference from other codes. The impact of this is captured in the denominator of the equation by $(1-\alpha)*P_{own}$. Power from another code can result in self interference reducing SINR and, as a consequence, throughput.

TABLE 1

Simulated Performance of a DAS system

| Orthogonality Factor | Ec/Io −16 dB (Macro) | Ec/Io −13 dB (Macro) | Ec/Io −10 dB (DAS) |
|---|---|---|---|
| 0.4 | 250 | 402 | 1191 |
| 0.6 | 264 | 458 | 1665 |
| 0.8 | 279 | 537 | 2602 |
| 0.9 | 287 | 588 | 3599 |

Table I above is a simulation that illustrates the effects of the DAS. Ec/Io represents the energy per chip to interference ratio (another measure of SINR) that does not include the impact of the orthogonality factor $\alpha$. When the orthogonality factor is considered, the impact of lack of orthogonality is illustrated in Table I. For a Macro network with Ec/Io typically in range of −16 dB to −13 dB, throughput is as stated. However in a DAS network, Ec/Io is typically greater due to repeaters and may be −10 dB. However, to obtain the best performance, the orthogonality factor also has to be low. Note that the available link gain improved in the range of 62%-200%.

Table I illustrates a couple of aspects. First, one advantage of a DAS deployment improves the performance of the HSPA network (if the DAS power is set to provide −10 dB Ec/Io). Second, Table I illustrates the advantage of having a deployment with high degree of orthogonality. These two aspects highlight the importance of a DAS system that automatically adjusts the power of the DAS power amplifier until maximum performance is realized.

FIG. 1 is a representation of a DAS system 8 servicing multiple indoor rooms in accordance with the present invention. The DAS system 8 comprises a DAS Service Module 30 and multiple remote antenna units such as remote antenna units 20a and 22a. The DAS Service Module 30 comprises a controller 60 which is coupled to a fiber optic feed 10 for external communications, and a dedicated control and monitoring channel 12. A GPS antenna 34 and a donor service antenna 32 are also coupled to the controller 60. The controller is coupled to interfaces such as 62a, which are coupled to the remote antenna units via cables 24a-24f.

Interiors 18a-18d represents an outline of a floor or enclosed space such as multiple floors in an office building for example. The interiors 18a-18d may have internal obstructions such as walls 36a-36d. In this non-limiting example, each interior such as 18d may have two remote antenna units such as remote antenna units 20d and 22d. However, the use of one or more remote antenna units located throughout an interior is contemplated. The remote antenna units such as 20d and 22d communicate to the UEs such as UE 16c and 16b.

Each of these remote antenna units transmits downlink signals within an interior that travel multiple paths before reaching the UE. As a result, the UE receives a superposition of multiple copies of the transmitted signals which may result in constructive or destructive interference. This multi-path interference may significantly affect the quality of service provided to the user as the user moves within the interior. For example, UE 16b receives downlink signals directly from remote antenna units 20d and 22d via paths 40a and 40c respectively. In addition, UE 16b also receives downlink signals that were partially reflected by walls 36a and 36b via paths 40b and 40d respectively. Hence, the quality of the service to UE 16b depends on overall interference of the downlink signals that traversed paths 40a-40c. The user may experience differing levels of the quality of service as the user moves within the interior 18d.

In other scenarios, the downlink signals received by the UE may be attenuated as a result of shadowing. For example, UE 16c may receive an attenuated downlink signal from remote antenna unit 20d because the signal passes though wall 36c. The strength of the downlink signal from remote antenna unit 22d may be stronger because the UE 16 receives the downlink signal through opening 38. Similarly, UE 16a will receive a stronger transmission signal from remote antenna unit 20a because path 40f is an unobstructed path. The UE 16a will receive a weaker signal from remote antenna unit 22a because the path 40e is obstructed by wall 36e.

Hence, a DAS network 8 supporting a single carrier with multiple remote transmitters may optimize transmission power level for each remote antenna unit based on the supported technology and environment. Feedback information from the UEs or mobile stations relating to downlink rate or channel quality is solicited for each DAS cluster serving a given area. This feedback information is analyzed to determine average data rate in the served cluster. In the case of DAS network repeating a macro signal, GPS information from mobile stations could be used to constrain analysis only to the area served by DAS. The downlink transmission power from all DAS remote antenna units serving the cluster is increased in steps from $P_{initial}$. The algorithm continues to increase power until the cluster capacity saturates. This algorithm can be utilized for a cluster repeating a single sector signal or a cluster implementing reuse of the same frequency.

Figure 2:
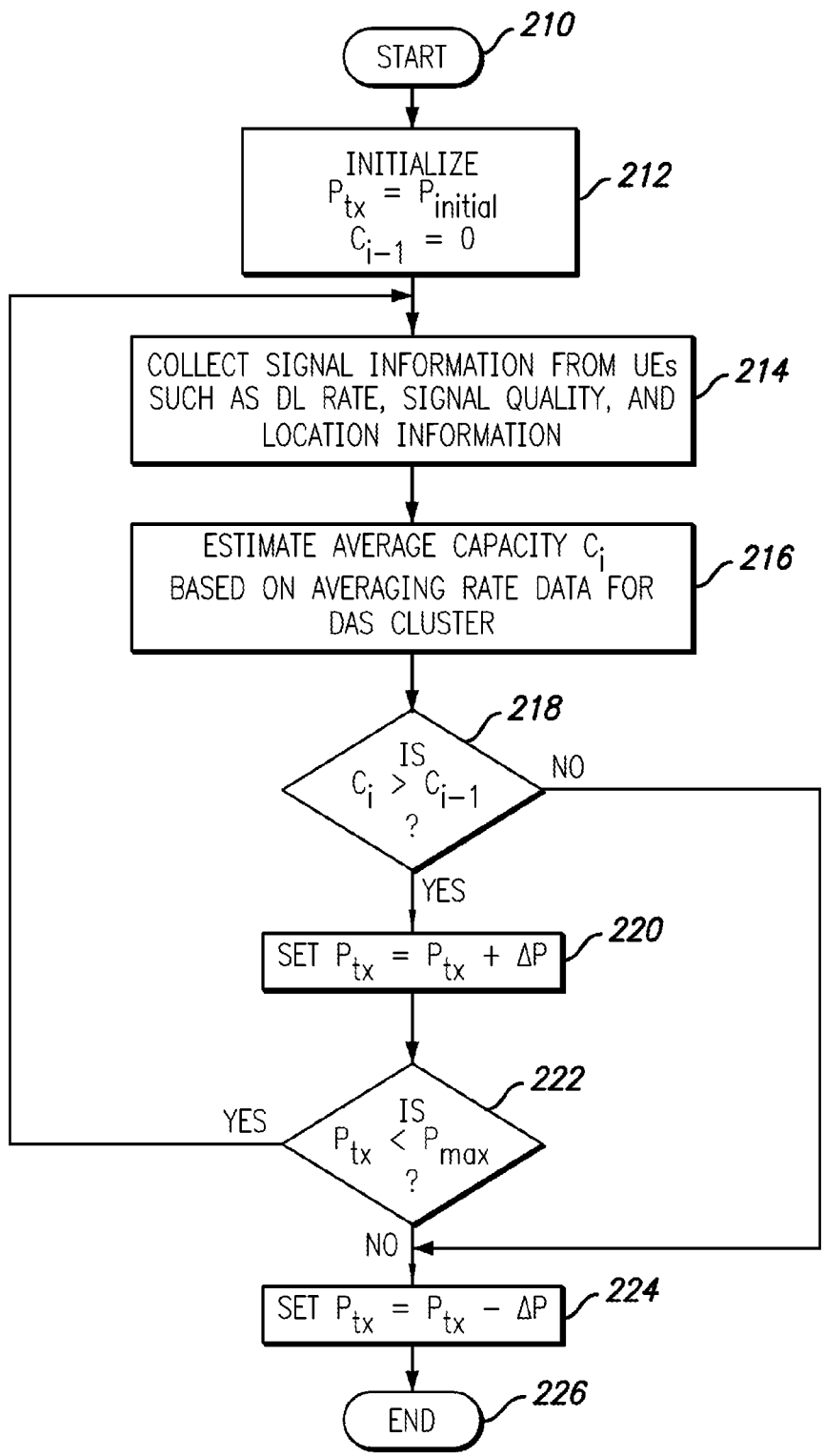
FIG. 2 is a flow chart illustrating an exemplary process for optimizing the downlink transmission power of remote antenna units within a distributed antenna system.

FIG. 2 is a flow chart illustrating an exemplary process for optimizing the downlink transmission power of the remote antenna units within a distributed antenna system 8. Essentially, the process collects signal information from the UEs and determines an average capacity $C_i$ of the system. If the capacity has improved since the prior iteration, the transmission power $P_{tx}$ increases and the next set of signal information is collected. On the other hand, if the average capacity $C_i$ has not improved since the prior iteration, the transmission power $P_{tx}$ is reduced. The transmission power $P_{tx}$ cannot exceed a maximum power level $P_{max}$.

Specifically, the process starts at step 210. The transmission power Ptx is set to an initial power level Pinitial and the initial capacity Ci−1 is set to 0 (step 212). Signal information is collected from the UEs such as UE 16b and 16c (step 214). The signal information may include, but is not limited to, the downlink data rate, the download signal quality received by the UE, the location information of the UE, the peak data rates, the maximum sustainable data rates of the downlink signals, and/or the number of UEs having a QOS ("Quality of Service") exceeding a QOS threshold. The average capacity Ci is estimated based on the collected signal information for the DAS cluster (step 216). The current estimated capacity Ci is compared to the prior average capacity Ci−1 (step 218). If the average capacity of the system has improved, the process proceeds to step 220, if the capacity has not improved, the process proceeds to step 224 which reduces the transmission power Ptx and terminates at step 226. The transmission power Ptx is increased and is set to Ptx+ΔP (step 220), In an embodiment, the transmission power Ptx is increased for all remote antenna units such as remote antenna units 20d and 22d. The transmission power Ptx is increased for only one remote antenna such as only remote antenna 20d or a subset of all remote antenna units in a preferred embodiment. The transmission power Ptx is then compared to a maximum transmission power Pmax (step 222). The maximum transmission power Pmax may be the maximum power for an individual remote antenna unit, or may be the maximum transmission power for a set of remote antenna units, or may be the maximum transmission power of the entire DAS system 8. If the transmission power Ptx is less than the maximum transmission power Pmax, the process proceeds to step 214.

Otherwise, the process proceeds to step 224. The transmission power $P_{tx}$ is reduced and is set to $P_{tx}-\Delta P$ (step 224). The process terminates at step 226.

As discussed above, the presence of an indoor, scattering environment is detrimental. Moreover, signals from neighboring remote antenna units may add to the multi-path fading. For such scenarios, it may benefit to actually reduce the downlink transmission power from each remote antenna unit to the level that minimizes the overall spread.

Embodiments provide systems and methods for optimizing heterogeneous system performance employing band selective power management. In an embodiment, the load capacity and the downlink transmission power operating parameters for each of the carriers are collected. The downlink transmission power operating parameters may include the minimum, the maximum, the nominal, and the current transmission power levels for each carrier. A control unit determines the optimized downlink transmission power levels for the carriers based on the load and downlink transmission power operating parameters. Transmission power levels for selected carriers are increased until the carrier load capacity is optimized. Power levels may be subsequently reduced to baseline performance parameters when the carrier loads are reduced.

Traditionally, DAS networks are deployed in order to enhance macro cellular signal coverage in regions experiencing low signal strengths. These systems have also been utilized to provide uniform coverage in heavy traffic deployments such as in stadiums and conference centers as a solution to capacity issues. In either of these two cases, it is common practice, especially in neutral host deployments, for a DAS network to cater to multiple carriers and multiple technologies. This is accomplished by employing per band power amplifiers or, alternatively, several wideband low power amplifiers used for repeating the signal from and to the base station equipment. In most applications, each carrier has a preset power level output which is maintained during operation.

Heterogeneous system performance may be optimized using band selective power management. The techniques described below address performance optimization via power management in DAS networks that support multiple technologies from 2G to 4G, with and without MIMO, and enhancing capability of current DAS networks to support future technologies and carriers.

The deployment and provisioning of such DAS systems is based on determining the power required for each carrier to provide uniformly good coverage for each technology in addition to maintaining some margin needed for future expansion. Such a provisioning strategy becomes inefficient as the number of technologies requiring support increases. The invention provides a solution to this problem in a cost effective fashion such that additional carriers can be accommodated with reduced costs.

Also, as multiple carriers are deployed, load on each carrier may not be uniform due to changes in user usage patterns and the adoption of the new technologies. Older carriers may still need to be supported for maintaining minimum coverage for a certain technologies. Non-uniformities in usage and capacity across carriers can be exploited to provide greater capacity and throughput to technologies that experience greater usage by intelligent power management across carriers.

Figure 3:
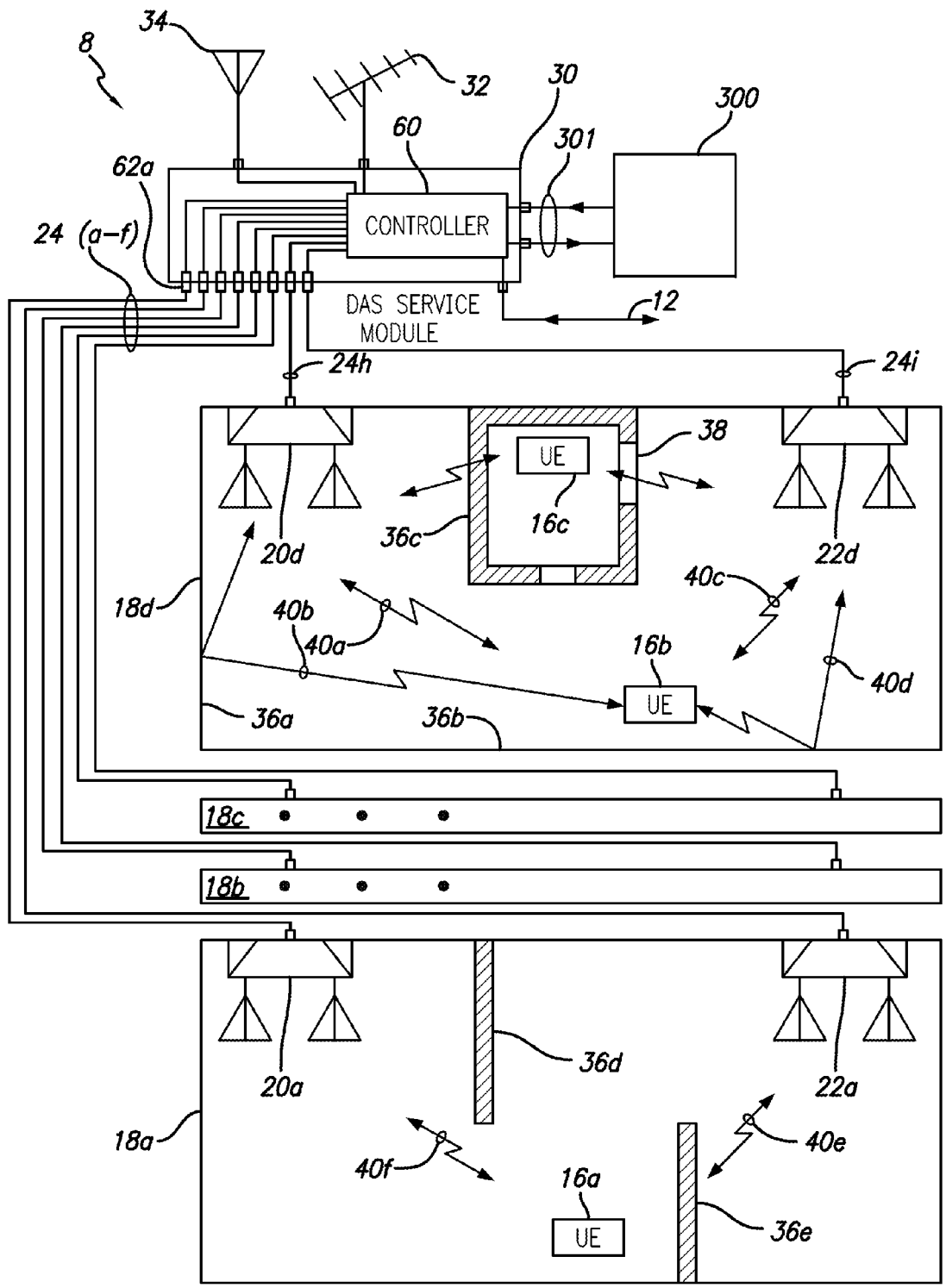
FIG. 3 is a representation of a DAS controlled by a base station subsystem in accordance with embodiments of the present invention.
Figure 4:
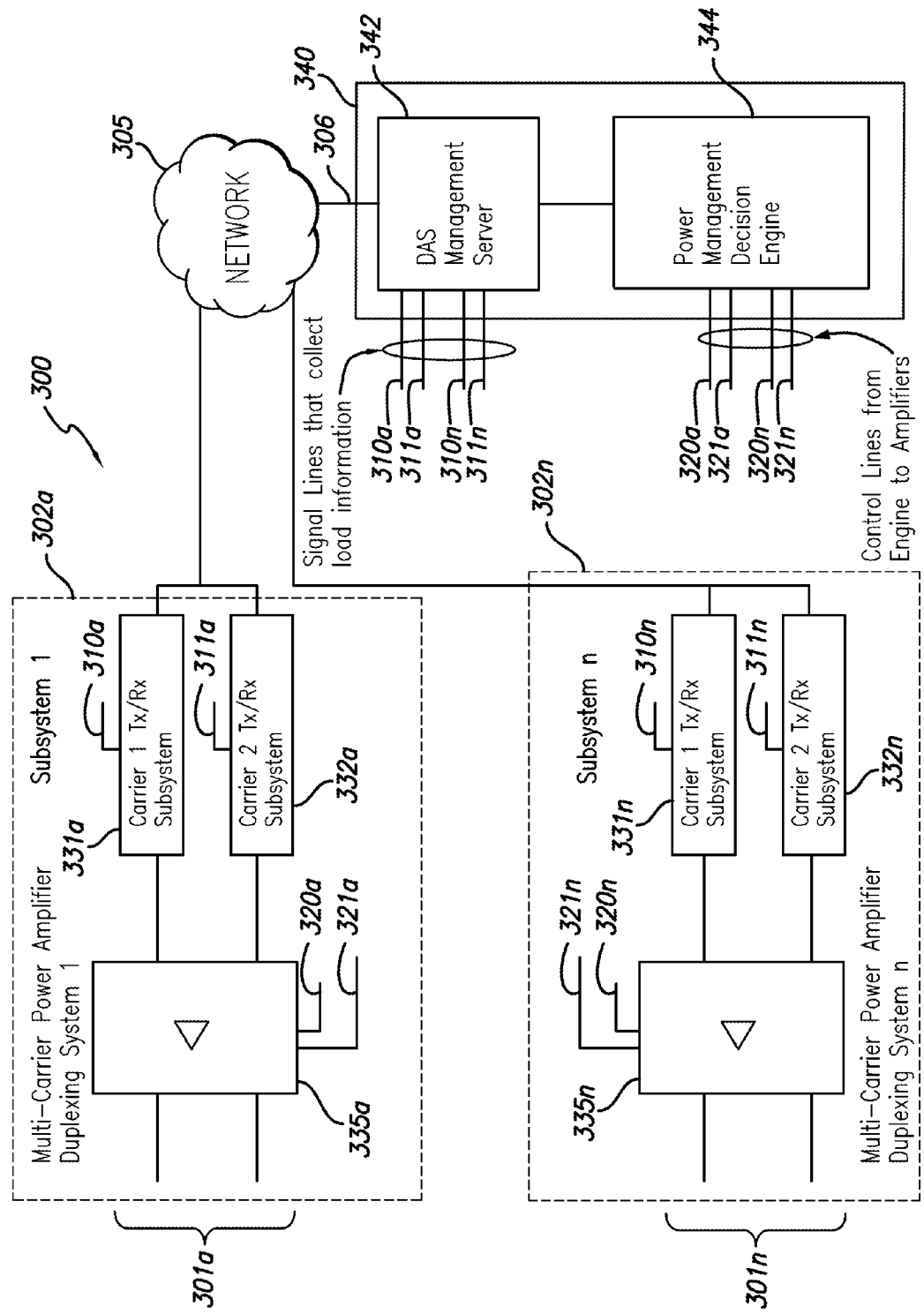
FIG. 4 is a schematic block diagram of base station subsystems and a control unit for collecting load information from the carriers and determining the transmission power levels for the carriers.

FIG. 3 depicts a DAS system 8 which is communicatively coupled with one or more multi-carrier base station subsystems 300 via lines 301. FIG. 4 presents an exemplary schematic block drawing of one of the multi-carrier base station subsystems 300. The one or more multi-carrier base station subsystems 300 may comprise a first multi-carrier subsystem 302a coupled to a network 305. The multi-carrier base station subsystems 300 may also have other multi-carrier subsystems illustrated generally as "n" by 302n which are also coupled to the network 305. The first multi-carrier subsystem 302a comprises one or more carrier transceivers represented by carrier transceivers 331a and 332a. The carrier transceivers 331a and 332a are coupled to a first multi-carrier power amplifier duplexing system 335a which provide voice and data communication signals to the DAS system via lines 301a depicted as lines 301 in FIG. 3. Likewise, the "nth" multi-carrier subsystem 302n comprises one or more carrier transceivers represented by carrier transceivers 331n and 332n. The carrier transceivers 331n and 332n are coupled to a corresponding multi-carrier power amplifier duplexing system 335n which provide voice and data communication signals via lines 301n.

The multi-carrier base station subsystems 300 further comprise a control unit 340 having a DAS management server 342 and a power management decision engine 344. The DAS management server 342 collects load information from one or more of the base station subsystems such as the first subsystem 301a and the n$^{th}$ subsystem 301n via signal lines 310a, 311a, 310n, and 311n. In an embodiment, the DAS Management Server 342 may collect load information from the network 305 via link 306 for example. As discussed below, the DAS management server 342 determines a ranked list of carriers based on the collected load information. A power management decision engine 344 determines the power levels for each of the carriers via control lines 320a, 320n, 320a, and 320n.

The total power available at each DAS Power Amplifier ("PA") is denoted as $P_{total}$. The total nominal power budget for carrier "c" can be represented as $P_{c\_nominal}$. The minimum power budget for carrier "c" can be represented as $P_{c\_min}$ and maximum as $P_{c\_max}$.

Each carrier is configured with values of $P_{c\_nominal}$, $P_{c\_min}$, and $P_{c\_max}$. In addition, different values could be configured based on whether a carrier employs a single transmit antenna or two transmit antennas (for MIMO enabled carriers). The parameters need to be engineered based on the technology based on the capacity gains achieved with a power gain.

A DAS Management Server collects load information "$L_c$" from all base stations providing service across carriers in order to determine a ranked list based on utilization per carrier. In an embodiment, the DAS Management Server may collect load information from a network, for example. Alternatively, a measure of load per carrier can be determined by measuring the average RF signal power per carrier and comparing it to a calibrated full load measurement.

The power management algorithm can be triggered manually or in an automated fashion in response to changes in system load when the load on a particular carrier exceeds pre-configured threshold $L_{high}$. The automated trigger also may include a hysteresis to ensure that the current load event persists and any re-distribution analysis occurs after the system response to a previous trigger reaches steady state.

The list of carriers eligible for Power borrowing and Power sharing are identified as follows. Carriers may be pre-assigned to one of two lists based on load. A carrier may be added to list of "Power Sharing" if $L_{c\_current} < L_{low}$. A carrier may be added to list of "Power Borrowing" if $L_{c\_current} > L_{high}$.

The power management decision engine determines $P_c$ as follows. The total surplus power is given by $$P_{surplus} = P_{surplus\_1} + P_{surplus\_2} + \ldots + P_{surplus\_n}$$

where $P_{surplus\_c}$ for each carrier is given by $$P_{surplus\_c} = \max(0, P_{c\_current} - \max(P_{c\_min}, f(L_c) * P_{c\_nominal}))$$

where $f(L_c)$ represents the power scaling factor required to support the load $L_c$ and $P_{c\_min}$ is a threshold used to ensure minimal coverage for carrier "c."

The requested power boost to carrier c is given by $$P_{c\_req} = \min((P_{c\_max} - P_{c\_current}), \max((f(L_c) - 1) * P_{c\_nominal}, 0))$$

where $f(L_c)$ represents current utilization, which is equal to 1 under nominal load.

For each carrier, the actual power boost is given by $$P_{c\_boost} = f * P_{surplus}$$

where $f = P_{c\_req} / (P_{1\_req} + P_{2\_req} + \ldots P_{n\_req})$ and represents the relative power need in carrier c.

In embodiments, the actual formulation for redistributing power could also be done using other implementations that may also include weighing factors to prioritize the share of power to one carrier over another.

For each carrier in the sharing list, $$P_c = P_{c\_current} + P_{c\_boost}.$$

The appropriate gains allocated to each carrier can then be implemented for example by some form of variable signal attenuation means at the input of the power amplifier that scales each signal such that appropriate power per carrier can be delivered using techniques well known in the art such as a VVA (Variable Voltage Attenuator).

The power re-distribution could revert back to baseline parameters as the time sensitive load on some carriers reduce.

Embodiments may be used to trade off lower utilization (and needed capacity) in some carriers to improve performance and capacity in other more heavily used carriers. Embodiments may advantageously improve overall network performance by selectively boosting carriers that can benefit from high power (like those that are MIMO enabled or using higher order QAM).

Embodiments also allow for over-provisioning and management of the existing DAS network in an effort to introduce additional carriers. Surplus power not utilized by some carriers or at certain periods can be intelligently allocated to others in need as a strategy to delay new DAS upgrades.

Figure 5:
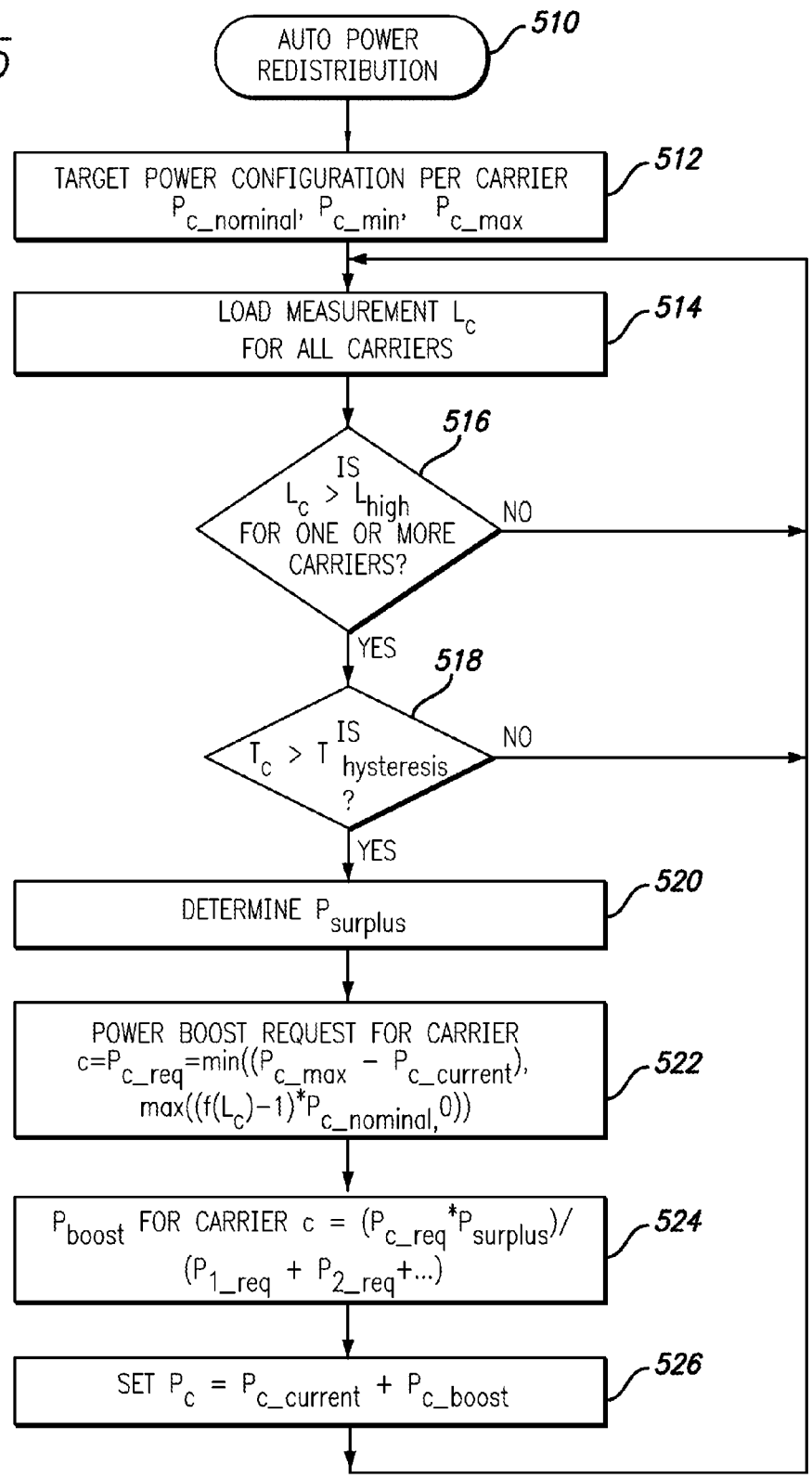
FIG. 5 is a flow chart illustrating an exemplary process for optimizing the downlink transmission power of carriers.

FIG. 5 is a flow chart illustrating an exemplary process for optimizing the downlink transmission power of carriers in accordance with the above general description. Auto power redistribution is initiated at step 510. The downlink transmission power operating parameters such as the minimum, the maximum, the nominal, and the current transmission power levels for each of the carriers are determined (step 512). The total power for each DAS Power Amplifier ("PA") is denoted as $P_{total}$. The total nominal power level for carrier "c" is represented as $P_{c\_nominal}$. The minimum power levels and the maximum power levels for carrier "c" are represented as $P_{c\_min}$ and $P_{c\_max}$ respectively.

As discussed above, each carrier is configured with values of $P_{c\_nominal}$, $P_{c\_min}$, and $P_{c\_max}$. In an embodiment, different values of these parameters may be configured based on whether a carrier employs a single transmit antenna or two transmit antennas (for MIMO enabled carriers). The parameters need to be determined based on the technology and the improvement of capacity achieved with a power gain.

The DAS Management Server 342 collects load information "$L_c$" from all base stations providing service across carriers in order to determine collected load information based on utilization per carrier in an embodiment (step 514). The DAS Management Server 342 may collect carrier load information from a network 5 via link 306 in an embodiment. In these non-limiting examples, the collected load information may be represented in various forms such as a ranked list or as a proportion of the full load measurement.

Figure 6A:
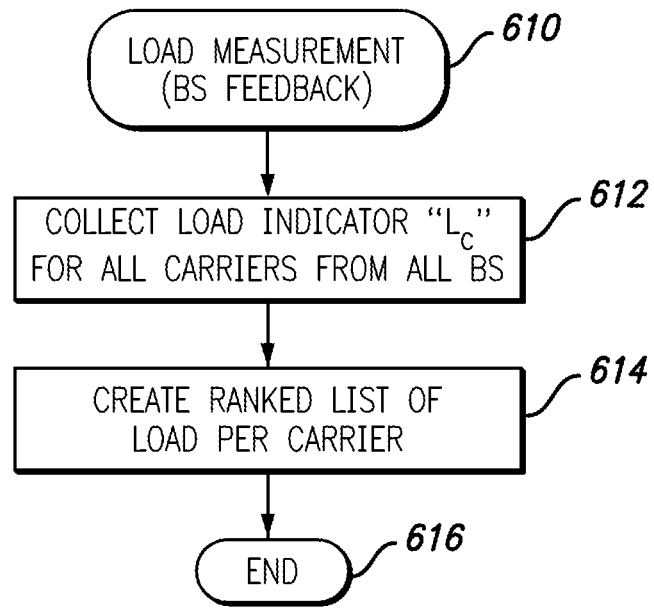
FIG. 6A is a flow chart illustrating an exemplary process for generating a ranked list of the load for the carriers.

For example, FIG. 6A depicts a flow chart illustrating an exemplary process for generating a ranked list of the load for the carriers. The process begins at step 610 and the load information for all of the carriers from all base stations (BS) are collected (step 612). A ranked list of the carriers based on the load information is generated (step 614) and the process ends (step 616).

Figure 6B:
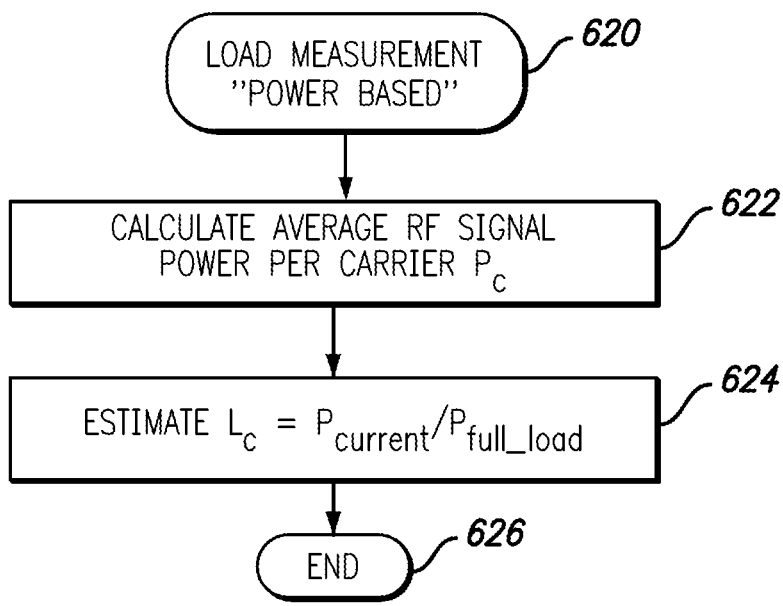
FIG. 6B is a flow chart illustrating an exemplary process for estimating the carrier load.

Alternatively, a measure of load per carrier may be determined by measuring the average RF signal power per carrier and comparing it to a calibrated full load measurement as depicted in FIG. 6B. The process begins (step 620) and the average RF signal power per carrier $P_c$ is calculated (step 622). An estimate of $L_c$ is calculated based on the ratio of $P_{current}$ and $P_{full\_load}$ (step 624). This process ends at step 626.

Referring to FIG. 5, in an embodiment, the power management control may be triggered in response to specific changes in system load, for example when the load $L_c$ on a particular carrier exceeds pre-configured threshold $L_{high}$ (step 516). The trigger also could include a hysteresis to ensure that the current load event persists and any re-distribution analysis occurs after the system response to a previous trigger reaches steady state in an embodiment (step 518). For example, the time $T_c$ elapsed since $L_c$ was detected to be greater than $L_{high}$ is determined and compared to a pre-determined threshold $T_{hysteresis}$ (step 518). In an embodiment, $T_c$ is reset to zero when $L_c$ falls below $L_{high}$. $T_{hysteresis}$ is the amount of time for which the load needs to exceed $L_{high}$ in order to require a change in transmission power levels. This feature ensures that the system does not react to instantaneous fluctuations in carrier load. If $T_c$ is greater than $T_{hysteresis}$, the process continues to step 520. Otherwise, the process returns to step 514 where the load information is collected from the carriers.

In an embodiment, the power management control proceeds to determine an increase of transmission power as follows. First, the total surplus, $P_{surplus}$ is determined (step 520). As used herein, the surplus and the total surplus power levels refer to the available power for a carrier and the total available power for multiple carriers, respectively. For example, the available power for a carrier may be represented by the difference between the current transmission power and the minimum power level required for a carrier to transmit within a given region.

Figure 6C:
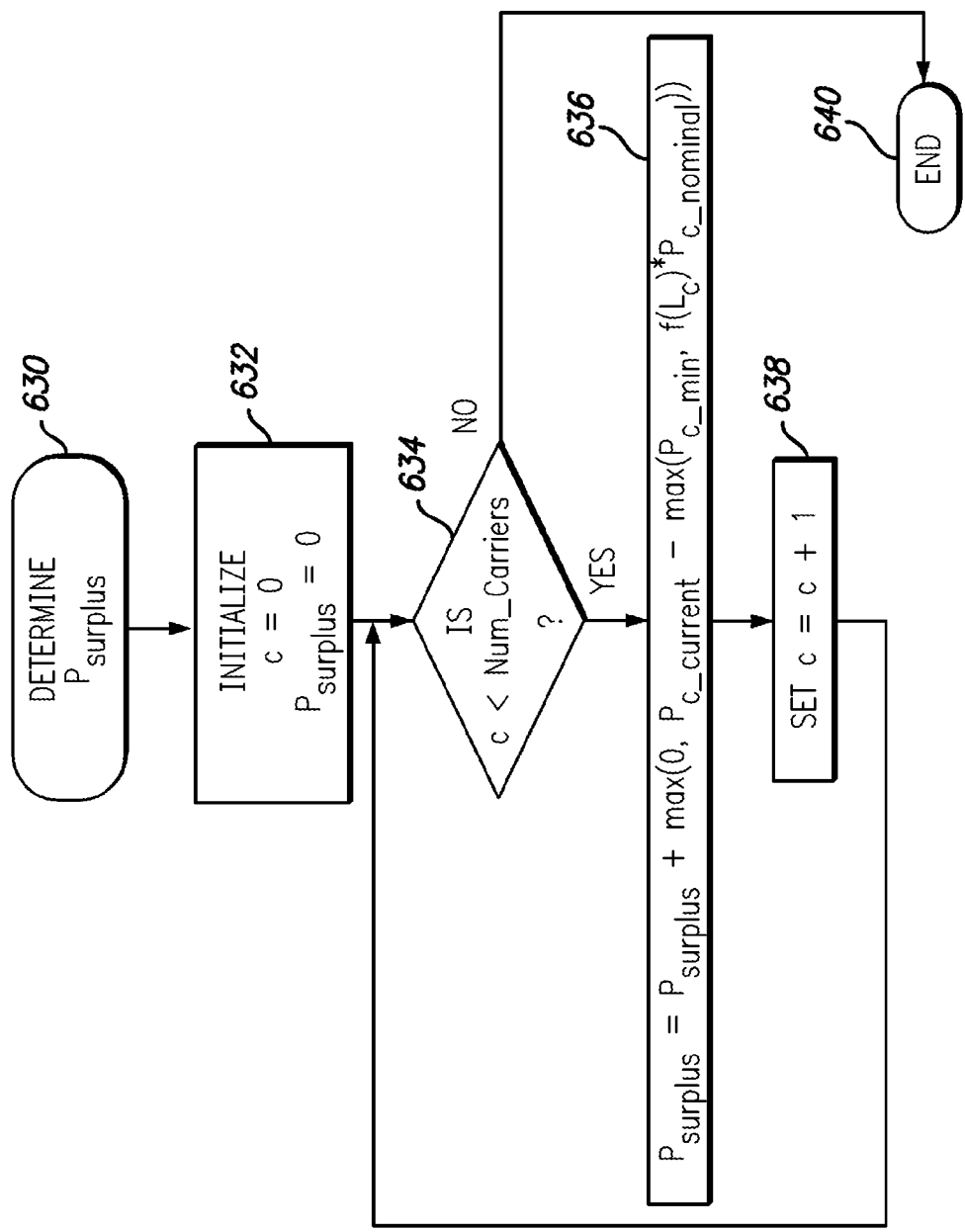
FIG. 6C is a flow chart illustrating an exemplary process for determining the surplus power for each of the carriers.

FIG. 6C is a flow chart illustrating an exemplary, non-limiting example of a process for determining the surplus power (i.e. available power) for each of the carriers. The process begins at step 630 and continues to step 632 where the carrier designation parameter c and the value of $P_{surplus}$ are set to zero. The carrier designation parameter c is compared with the total number of carriers Num_Carriers (step 634). If the carrier designator parameter c is less than the total number of carriers Num_Carriers, $P_{surplus}$ is calculated (step 636). Otherwise, the process ends (Step 640).

The total surplus power is given by the expression $$P_{surplus}=P_{surplus\_1}+P_{surplus\_2}+\ldots+P_{surplus\_n}$$

where $P_{surplus}$ for each carrier may be determined based on the transmission power information by $$P_{surplus\_c}=\max(0, P_{c\_current}-\max(P_{c\_min}, f(L_c)*P_{c\_nominal}))$$

where $f(L_c)$ represents the power scaling factor required to support the load $L_c$ and $P_{c\_min}$ is a threshold used to ensure minimal coverage for carrier "c." $f(L_c)$ represents the current utilization, which is equal to 1 under nominal load. In an embodiment, $f(L_c)$ may be expressed as $$f(L_c)=L_c/L_{nominal}.$$

The carrier designator parameter c is incremented by one (step 638), and the process returns to step 634.

Referring to FIG. 5, the requested power boost for each carrier $P_{c\_req}$ is determined (step 522). The requested power boost, $P_{c\_req}$, to carrier c may be given by the equation $$P_{c\_req}=\min((P_{c\_max}-P_{c\_current}), \max((f(L_c)-1)*P_{c\_nominal}, 0)).$$

For each carrier, the actual Power boost $P_{c\_boost}$ is determined (step 524) which may be given by the equation $$P_{c\_boost}=f*P_{surplus}$$

where $f=P_{c\_req}/(P_{1\_req}+P_{2\_req}+\ldots P_{n\_req})$ is a proportionality factor which represents the relative power required by carrier c. Note that embodiments for redistributing power may also comprise other methods which may also include weighing factors to prioritize the share of power to one carrier over another.

For each carrier in the power sharing list, the carrier power $P_c$ is reset to $P_c=P_{c\_current}+P_{c\_boost}$ (step 526). The power control process then returns to step 514.

In an embodiment, the appropriate gains allocated to each carrier may be controlled through various methods such as through some form of variable signal attenuation at the input of the power amplifier that scales each signal such that appropriate power per carrier can be delivered. For example, control lines 320a, 321a, 320n, and 321n may then be activated to change the gain of the multi-carrier power amplifier duplexing system 335a and 335n for a given carrier. The power re-distribution could revert back to baseline parameters as the time sensitive load on some carriers is reduced.

The present invention has been described primarily as a system and means for dynamically optimizing the transmission power levels for downlink signals transmitted from a distributed antenna system to user equipment such as cellular telephones or smart phones. In this regard, the system and means for optimizing transmission power levels for downlink signals are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for optimizing downlink transmission power of a distributed antenna system comprising a plurality of antenna units, comprising:
   collecting individual carrier load information from a multi-carrier base station communicating with each of the plurality of antenna units using a plurality of carriers;
   varying a downlink transmission power for at least one carrier of the plurality of carriers to a different value from at least one other carrier based on the collected carrier load information and an individual weighing factor for the at least one carrier of the plurality of carriers, wherein power for the plurality of carriers is redistributed based on the weighing factors for the plurality of carriers to prioritize sharing of power between the plurality of carriers;
   optimizing, based on the collected carrier load information, downlink transmission power of a subset of the plurality of antenna units to optimize the downlink transmission power of fewer than all of the plurality of antenna units communicating using the plurality of carriers;
   determining a time period during which the at least one carrier has a carrier load that exceeds a predefined carrier load threshold;
   comparing the time when the carrier load of the at least one carrier exceeds the predefined carrier load threshold to a temporal hysteresis threshold;
   maintaining a change in downlink power transmission level to the at least one carrier when the time that the carrier load exceeds the predefined carrier load is greater than the temporal hysteresis threshold;
   determining, based on the collected carrier load information, whether an average capacity of the distributed antenna system has improved compared to a prior average capacity;
   in response to determining that the average capacity of the distributed antenna system has improved, increasing the transmission power for the subset of antenna units within the distributed antenna system to optimize the downlink transmission power of the subset of the antenna units; and
   in response to determining that the average capacity of the distributed antenna system has failed to improve, reducing the downlink transmission power and terminating optimization of the downlink transmission power of the antenna units.

2. The method for optimizing the downlink transmission power of a distributed antenna system as set out in claim 1, wherein the varying the downlink transmission power further comprises:
   determining whether the at least one carrier of the plurality of carriers has a carrier load greater than the predefined carrier threshold; and,
   increasing the downlink transmission power for the carrier having the carrier load greater than the predefined carrier threshold.

3. The method for optimizing the downlink transmission power of a distributed antenna system as set out in claim 2, further comprising:
   determining downlink transmission power operating parameters for the plurality of carriers; and,
   determining an available surplus increase of downlink transmission power for the carrier having the carrier load greater than the predefined threshold;
   wherein increasing the downlink transmission power for the carrier having the carrier load greater than the predefined threshold further comprises increasing the downlink transmission power by an amount less than or equal to the determined available increase of downlink transmission power.

4. The method for optimizing the downlink transmission power of a distributed antenna system as set out in claim 3, wherein increasing the downlink transmission power further comprises:
   determining a total available power level for the plurality of carriers;
   determining a proportionality factor based on the downlink transmission power operating parameters and the collected carrier load information; and
   determining the product of the total available power level and the proportionality factor.

5. The method for optimizing the downlink transmission power of a distributed antenna system as set out in claim 4, wherein determining the total available power level is based on the downlink transmission power operating parameters and the collected carrier load information.

6. The method for optimizing the downlink transmission power of a distributed antenna system as set out in claim 1, further comprising:
   resetting the downlink transmission power to baseline values when the collected carrier load is less than a carrier load threshold.

7. The method for optimizing the downlink transmission power of a distributed antenna system as set out in claim 1, further comprising generating a ranked list of carriers based on the collected carrier load information from a plurality of carriers.

8. The method for optimizing the downlink transmission power of a distributed antenna system as set out in claim 7, wherein varying a downlink transmission power further comprises varying a downlink transmission power for carriers ranked highest in the ranked list of carriers.

9. A wireless system, comprising:
   a multi-carrier base station receiving from each of a plurality of antenna units of a distributed antenna system multi-carrier communication signals having a plurality of carriers, the multi-carrier base station comprising one or more multi-carrier amplifier systems configured to amplify the multi-carrier communication signals;
   one or more antennas coupled to the base station and configured to provide a downlink signal; and,
   a power management control unit configured to:
      vary a downlink transmission power for at least one carrier of the plurality of carriers to a different value from at least one other carrier based on the collected carrier load information and an individual weighing factor for the at least one carrier of the plurality of carriers, wherein power for the plurality of carriers is redistributed based on the weighing factors for the plurality of carriers to prioritize sharing of power between the plurality of carriers;

optimize, based on the collected carrier load information, downlink transmission power of a subset of the plurality of antenna units to optimize the downlink transmission power of fewer than all of the plurality of antenna units communicating using the plurality of carriers;

determine a time period during which the at least one carrier has a carrier load exceeds a predefined carrier load threshold;

compare the time when the carrier load of the at least one carrier exceeds the predefined carrier load threshold to a temporal hysteresis threshold;

maintain a change in downlink power transmission level to the at least one carrier when the time that the carrier load exceeds the predefined carrier load is greater than the temporal hysteresis threshold;

determine, based on the collected carrier load information, whether an average capacity of the distributed antenna system has improved compared to a prior average capacity;

in response to determining that the average capacity of the distributed antenna system has improved, increase the transmission power for the subset of antenna units within the distributed antenna system to optimize the downlink transmission power of the subset of the antenna units; and in response to determining that the average capacity of the distributed antenna system has failed to improve, reduce the downlink transmission power and terminate optimization of the downlink transmission power of the antenna units.

10. The wireless system as set out in claim 9, wherein said power management control unit comprises a load collection means for collecting load information of the plurality of carriers and providing values of downlink transmission power levels to the multi-carrier amplifier systems.

11. The wireless system as set out in claim 10, wherein said load collection means is coupled to a network and collects load information from the network.

12. The wireless system as set out in claim 10, wherein said load collection means is coupled to the multi-carrier base station and collects load information from the multi-carrier base station.

13. The wireless system as set out in claim 10, wherein the control unit further comprises a power management decision engine configured to generate power level control signals to the carriers, wherein the power level control signals are based on the collected load information.

14. A wireless distributed antenna system, comprising:
a multi-carrier base station configured to receive multi-carrier communication signals having a plurality of carriers, the multi-carrier base station comprising one or more multi-carrier amplifier systems configured to amplify the multi-carrier communication signals;
a distributed antenna system having a plurality of separate antenna systems, the distributed antenna system coupled to the multi-carrier base station and configured to provide a downlink signal; and,
a control unit coupled to the multi-carrier base station and configured to:
collect load information of the plurality of carriers,
provide different values of downlink transmission power to the multi-carrier amplifier systems based on the collected carrier load information and an individual weighing factor each carrier of the plurality of carriers, wherein power for the plurality of carriers is redistributed based on the weighing factors for the plurality of carriers to prioritize sharing of power between the plurality of carriers, optimize, based on the collected carrier load information, the downlink transmission power to a subset of the plurality of multi-carrier amplifier systems to optimize the downlink transmission power of fewer than all of the plurality of multi-carrier amplifier systems communicating using the plurality of carriers;

determine a time period during which the at least one carrier has a carrier load exceeds a predefined carrier load threshold;

compare the time when the carrier load of the at least one carrier exceeds the predefined carrier load threshold to a temporal hysteresis threshold;

maintain a change in downlink power transmission level to the at least one carrier when the time that the carrier load exceeds the predefined carrier load is greater than the temporal hysteresis threshold;

determine, based on the collected carrier load information, whether an average capacity of the distributed antenna system has improved compared to a prior average capacity;

in response to determining that the average capacity of the distributed antenna system has improved, increase the transmission power for the subset of antenna units within the distributed antenna system to optimize the downlink transmission power of the subset of the antenna units; and in response to determining that the average capacity of the distributed antenna system has failed to improve, reduce the downlink transmission power and terminate optimization of the downlink transmission power of the antenna units.

15. The wireless system of claim 14, wherein the control unit is further configured to collect the load information from one of: the multi-carrier base station or a network.

16. The wireless system of claim 14, wherein the control unit further comprises:
a distributed antenna system management server configured to collect load information from the plurality of carriers; and
a power management decision engine configured to generate power level control signals to the carrier.

17. The wireless system of claim 16, wherein the power management decision engine is configured to determine the power level control signals based on the collected load information and downlink power operating parameters.

18. The wireless system of claim 14, further comprising:
a second multi-carrier base station configured to receive second multi-carrier communication signals having a plurality of second carriers, the second multi-carrier base station comprising one or more second amplifiers configured to amplify the second multi-carrier communication signals; and,
a second distributed antenna system having plurality of second separate antenna systems, the second distributed antenna system coupled to the second multi-carrier base station and configured to provide a second downlink signal;
wherein the control unit is coupled to the second multi-carrier base station and is configured to collect load information from the plurality of second carriers and provide values of downlink transmission power to the plurality of second carriers.

19. The method for optimizing the downlink transmission power of a distributed antenna system as set out in claim 1, further comprising:

configuring, for each carrier, a total nominal power budget, a minimum power budget and a maximum power budget dependent on a number of transmit antennas on each antenna unit employed by the carrier.

\* \* \* \* \*